United States Patent [19]

Ruehle

[11] Patent Number: 4,486,865
[45] Date of Patent: Dec. 4, 1984

[54] PRESSURE AND VELOCITY DETECTORS FOR SEISMIC EXPLORATION

[75] Inventor: William H. Ruehle, Westport, Conn.

[73] Assignee: Mobil Oil Corporation, New York, N.Y.

[21] Appl. No.: 295,966

[22] Filed: Aug. 25, 1981

Related U.S. Application Data

[63] Continuation-in-part of Ser. No. 182,916, Sep. 2, 1980, abandoned.

[51] Int. Cl.³ .............................................. G01V 1/36
[52] U.S. Cl. ........................................ 367/24; 367/46
[58] Field of Search ........................... 367/15, 20–24, 367/56, 46, 67, 48; 181/112

[56] References Cited

U.S. PATENT DOCUMENTS

| | | | |
|---|---|---|---|
| 2,740,945 | 4/1956 | Howes | 367/56 |
| 3,274,542 | 9/1966 | Ruehle | 364/576 X |
| 3,290,645 | 12/1966 | Pavey, Jr. et al. | 367/24 |
| 3,863,201 | 1/1975 | Briggs et al. | 367/15 X |
| 4,134,097 | 1/1979 | Cowles | 367/24 |
| 4,210,897 | 7/1980 | Hutchins | 114/244 |
| 4,348,749 | 9/1982 | Galbraith, Jr. | 367/48 X |

FOREIGN PATENT DOCUMENTS 2004648 4/1979 United Kingdom .
2030400 4/1980 United Kingdom .

Primary Examiner—Maynard R. Wilbur
Assistant Examiner—K. R. Kaiser
Attorney, Agent, or Firm—Alexander J. McKillop; Michael G. Gilman; Frank J. Kowalski

[57] ABSTRACT

Pressure and velocity detectors produce outputs which are combined to substantially cancel ghost reflections. The pressure detector produces a positive output in response to upwardly travelling compressional waves and a negative output in response to downwardly travelling rarefaction waves. The velocity detector for this is a positive output in response to upwardly travelling compressional waves and a positive output in response to downwardly travelling rarefaction waves. These outputs are filtered so that the impulse response of the rarefaction waves cancels. The filtered outputs are combined to produce an output in which the ghost reflection is substantially suppressed.

2 Claims, 10 Drawing Figures

PRESSURE AND VELOCITY DETECTORS FOR SEISMIC EXPLORATION

CROSS REFERENCE TO RELATED APPLICATION

The present application is a continuation-in-part of parent application Ser. No. 182,916, filed Sept. 2, 1980, presently abandoned which is incorporated by reference herein in its entirety.

BACKGROUND OF THE INVENTION

This invention relates to seismic exploration and more particularly to exploration in which it is desired to suppress ghost reflections caused by downwardly travelling rarefaction waves.

Land and marine seismic exploration have conventionally used geophones or hydrophones which produce an output in response to pressure. U.S. Pat. No. 3,346,838, Johnson III et al is an example of a pressure sensitive detector.

Another type of detector responds to the velocity of the particles of the medium surrounding the detector. In U.S. Pat. No. 2,982,942 White, three velocity-sensitive detectors 11, 12 and 13 are mounted at a listening station. The pressure-sensitive detector 15 is positioned at the same location. The signals from these detectors indicate the amplitude and direction of the acoustic energy impinging upon the detectors.

In seismic exploration, energy is reflected from subsurface interfaces and is detected to produce seismograms. It is desired to record only primary reflections which are upwardly travelling compressional waves caused by a reflection of the seismic energy from a subsurface interface. Other reflections such as multiple and ghost reflections obscure the seismogram. One particularly troublesome reflection is a ghost reflected from the surface. The ghost reflection travels downwardly as a rarefaction wave.

SUMMARY OF THE INVENTION

In accordance with the present invention, ghost reflections are suppressed by combining the outputs of pressure and velocity detectors. A filter changes the frequency content of at least one of the detectors so that the ghost reflections cancel when the outputs are combined. Further in accordance with the invention, the gains of the outputs are changed so that the ghost reflections cancel when they are combined.

In carrying out the invention in one embodiment thereof, a plurality of detectors are placed on the ocean bottom in a marine seismic exploration system. The detectors are paired, one pressure detector and one velocity detector in each pair. The pressure detector produces a positive output in response to upwardly travelling compressional waves and a negative output in response to downwardly travelling rarefaction waves. The velocity detector produces a positive output in response to upwardly travelling compressional waves and a positive output in response to downwardly travelling rarefaction waves. These outputs are inverse filtered by filters which have the inverse characteristics of the impulse response of the distortions in each output. The outputs of these filters include positive impulses for both detectors' response to upwardly travelling compressional waves and a positive impulse response by the velocity detector to the downwardly travelling rarefaction wave, and a negative impulse response by the pressure detector to the downwardly travelling rarefaction wave. This negative impulse cancels the positive impulse response of the velocity detector to the ghost reflection.

The foregoing and other objects and the features and advantages of the invention will be better understood from the following, more detailed description and appended claims.

DESCRIPTION OF THE PREFERRED EMBODIMENT

Figure 1:
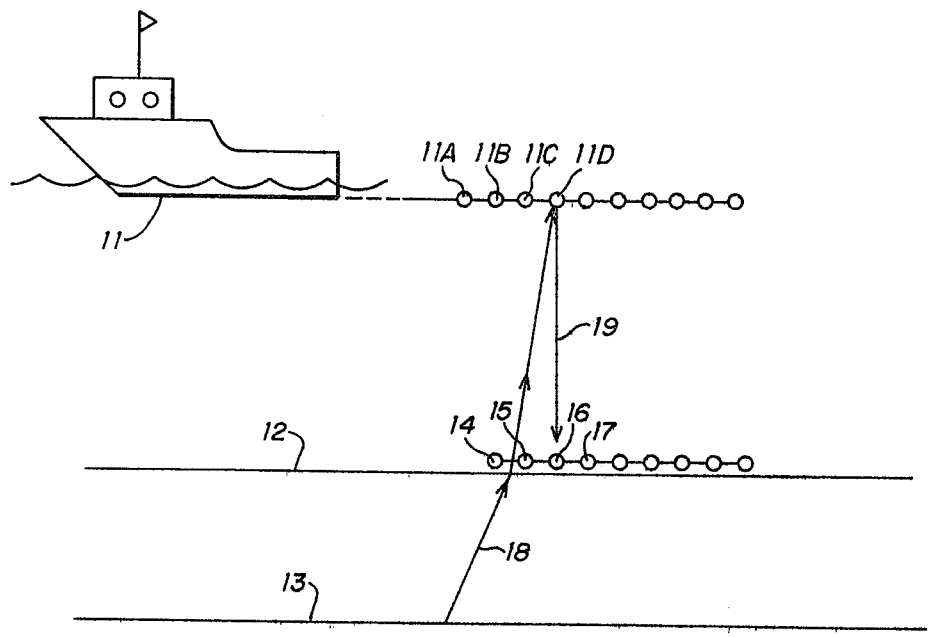
FIG. 1 shows a marine seismic exploration system.

Referring to FIG. 1, boat 11 tows a marine seismic pulse source such as 11A through D along a line of exploration. Seismic detectors 14–17 are placed on the ocean floor. Seismic energy from sources 11A through D is directed toward the water bottom 12 and is reflected from a subsurface interface such as 13. A plurality of detectors such as 14–17 detect the reflections. Each of the detectors include a pressure detector 14A–17A and a velocity detector 14B–17B. Seismic energy reflected from the interface 13 travels along the ray path 18. This primary reflection is an upwardly travelling compressional wave.

In order to understand the polarity differences in the seismometer depth effect, a positive pressure pulse 18 travelling vertically upward from interface 13 toward detector 14 at a depth d beneath the surface of the water is considered. At time $t=0$ the pulse arrives at detector 14. It continues to the surface where it is reflected and returns to detector 14 at a time $\tau_d$, where $\tau_d$ is the two-way time between detector 14 and the surface, $$\tau_d = 2d/c.$$

The water surface is a free surface, so the boundary conditions demand that the total pressure be zero. If the amplitude of upgoing ray 18 is $a_1$ and that of the downgoing ray 19 is $a_2$, the boundary condition may be written $$a_1 + a_2 = 0.$$

Consequently, the amplitude of the downgoing pulse is $-a_1$ which is the usual statement of polarity reversal upon reflection at a free surface.

Figure 5A:
FIGS. 5A–5C are time domain representations of FIGS. 4A–4C.

The response of pressure detector 14A and depth d to an uptravelling wave is, therefore, a pair of impulses, a positive one at $t=0$ and a negative one at $t=\tau_d$, where $\tau_d = 2d/c$ and c is the velocity of propagation in the water as illustrated in FIG. 5A.

The response of velocity detector 14B is somewhat different. The boundary condition at the surface is that the upgoing and downgoing velocities must be equal, or, the alternate statement, that the velocity at the surface is doubled. We write the upgoing velocity as a vector $\vec{V_1}$ and the downgoing as $\vec{V_2}$ and have $$\vec{V_1} = \vec{V_2}$$

Figure 5B:

The response of the velocity detector and depth d is, therefore, a pair of unit impulses of the same sign separated by a time $\tau_d$, as illustrated in FIG. 5B.

Figure 2A:
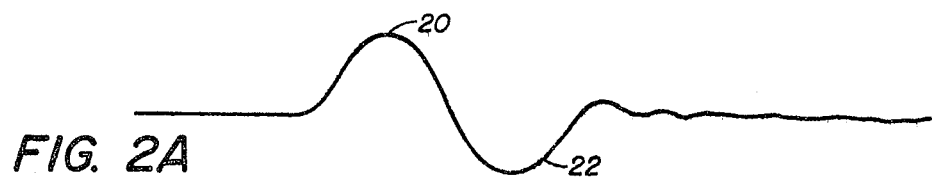
FIGS. 2A and 2B depict the response of a pressure detector and a velocity detector respectively.
Figure 2B:
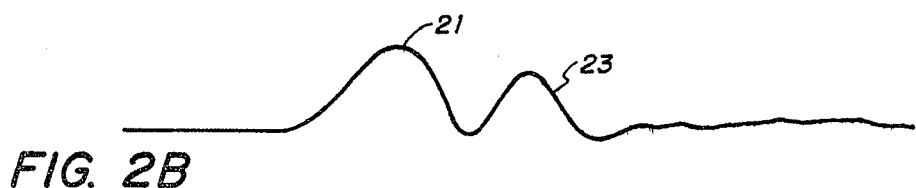

The other part of the water layer effect is the reverberation train and is the same for both types of phones. The response to the reflection from the surface is different for the two detectors as illustrated in FIGS. 2A and 2B. It is worth noting that, for ideal responses to the surface reflection, if the two phone outputs are recorded scaled and summed, the depth effect of the phone should cancel out for vertically travelling waves.

The impulse responses for the water surface reflections for the two phones have a frequency filtering effect which may be readily examined by taking the Fourier transform of the responses. For the velocity detector transform we have $G_v(f)$, where $$G_v(f) = 1 + e^{-2\pi i f \tau_d}$$
$$= e^{-\pi i f \tau_d}(e^{\pi i f \tau_d} + e^{-\pi i f \epsilon d})$$
$$= 2e^{-\pi i f \tau_d} \cos \pi f \tau_d$$

and for the pressure detector transform we have $G_h(f)$, where $$G_h(f) = 1 - e^{-2\pi i f \tau_d}$$
$$= e^{-\pi i f \tau_d}(e^{\pi i f \tau_d} - e^{-\pi i f \tau_d})$$
$$= 2ie^{-\pi i f \tau_d} \sin \pi f \tau_d.$$

The phase is thus made up of several parts. The $e^{-\pi i f \tau_d}$ factor is common to both and does not produce any phase difference between the two. It may be thought of as a linear phase component which shifts the filter from a symmetrical time extent about t=0 to a causal filter, a shift of $\tau_d/2$ in time. The velocity detector phase component associated with $\cos \pi f \tau_d$ is zero up to the first zero crossing of the cosine, then it is $\pi$ until the second zero crossing, etc. The pressure detector transform is purely imaginary, and, therefore, has a 90° phase shift associated with i. The $\sin \pi f \tau_d$ will also produce phase changes of $\pi$ at the zero crossings. The amplitude spectra for the two are obtained from the magnitude of the Fourier transforms.

$$|G_v(f)| = \sqrt{2}(1 + \cos 2\pi f \tau_d)^{\frac{1}{2}} = 2|\cos \pi f \tau_d|$$

$$|G_h(f)| = \sqrt{2}(1 - \cos 2\pi f \tau_d)^{\frac{1}{2}} = 2|\sin \pi f \tau_d|$$

Figure 4A:
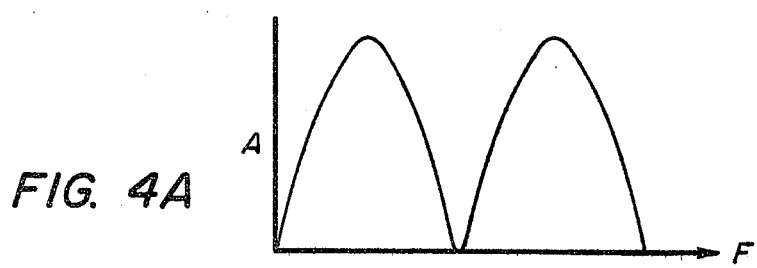
FIGS. 4A–4C show the impulse responses of the two filters and the impulse response of the combined output in the frequency domain.
Figure 4B:
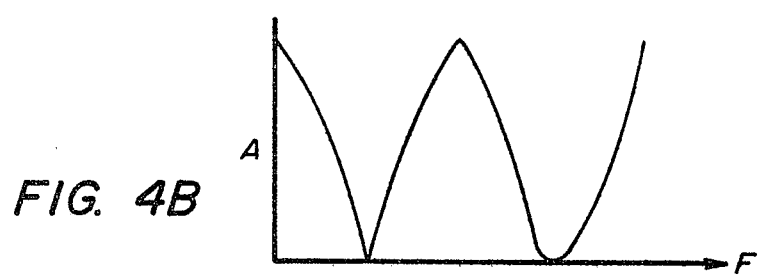

A plot of the amplitude responses is shown in FIGS. 4A and 4B.

From the amplitude spectra we note that the low frequency response of the velocity detector is much greater than that of the pressure detector, so that we expect more low frequency content on the velocity phone recording. We also note that the phase difference between the two types of phones is 90°, but that it starts as a 90° lead for the pressure detector at f=0 and jumps to a 90° lag at the first zero of the velocity detector response. For the frequency range of interest in reflection seismic data, the filtering effect of the depth of the phones produces an apparent 90° phase shift of the data.

The filter effect corresponding to seismometer depth is not minimum phase. For both types of detectors, there is a zero on the unit circle in the z-transform domain. This implies that a stable inverse does not exist. However, even for the idealized perfect surface reflector, a good approximation can be achieved by stabilizing a deconvolution operator with the addition of a small amount of white noise to the zero lag of the auto correlation function prior to the operator computation. In addition, the effective reflection coefficient at the surface is probably less than one in magnitude, since the water surface is somewhat rough due to wave action. This means that the actual depth effect is not precisely a 90° phase shift and that it is minimum phase. Minimum phase deconvolution (spike deconvolution or Flatiron) should compensate reasonably well for the depth effect and should, therefore, remove the apparent 90° phase shift while compensating for amplitude effects.

As stated previously, pressure detector 14A produces an output as shown in FIG. 2A, and velocity detector 14B produces an output of the type shown in FIG. 2B. In response to the upwardly travelling compressional wave (primary reflection) the pressure detector produces a positive going output 20, and the velocity detector produces a positive going output 21. The compressional wave is reflected from the surface and travels downwardly along the ray path 19 as a rarefaction wave. In response to this downwardly travelling rarefaction wave, the pressure detector produces a negative going output 22, and the velocity detector produces a positive going output 23.

Commercially available pressure and velocity detectors are suitable for use in practicing the invention. Different detectors have different frequency and amplitude responses to detected signals. Unfortunately, FIGS. 2A and 2B are oversimplifications of the response of these detectors to detected primary and ghost reflections. It is necessary to filter and adjust the amplitudes of the outputs of the two detectors so that the ghost reflections will cancel.

Figure 3:
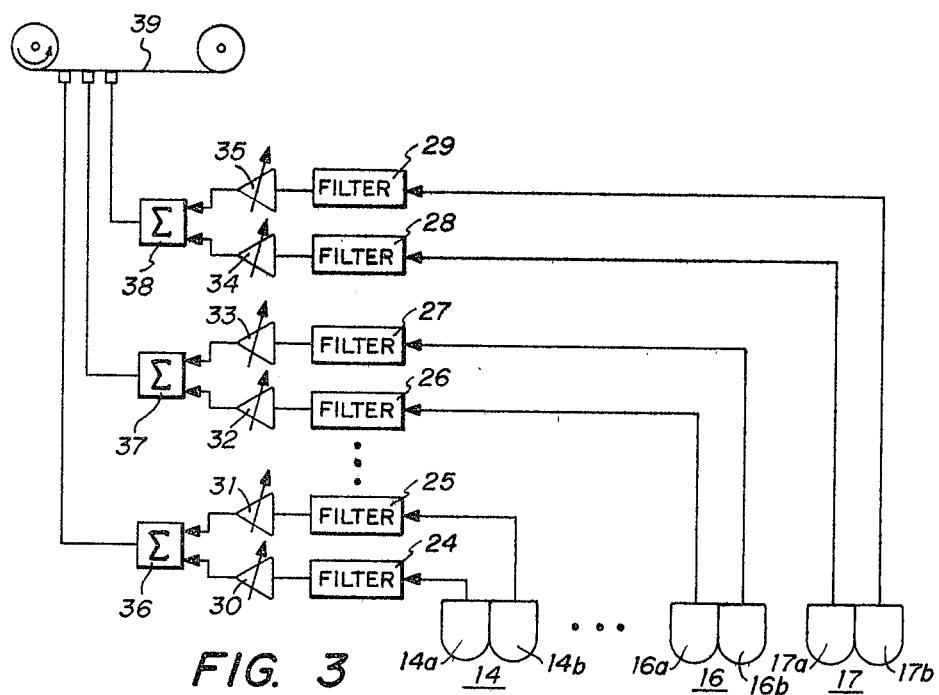
FIG. 3 shows the combined pressure and velocity detectors, filters and gain changing means of the present invention.

Referring to FIG. 3, detector 14 includes a pressure detector 14A and a velocity detector 14B. Detector 16 includes a pressure detector 16A and a velocity detector 16B. Detector 17 includes a velocity detector 17A and a pressure detector 17B.

The outputs of these detectors are applied to the filters 24, 25 . . . 29. Each filter has characteristics specified in the responses of FIGS. 4 and 5. FIG. 4A shows the frequency domain of the output of a pressure detector after it has been filtered by the filter 24 for example. FIG. 4B shows the frequency domain of the output of a velocity detector after it has been filtered by filter 25. In order to provide filters which have the characteristics shown in FIGS. 4A and 4B, it is necessary to measure the frequency response of the actual detectors to primary and ghost reflections. Having measured the characteristics of the detectors, these measurements are used to provide inverse filtering which will produce the response characteristics of the type shown in FIGS. 4A and 4B. U.S. Pat. No. 3,275,980, Foster (OPTISEP) teaches the manner in which such filters are implemented. Time domain filtering is particularly suitable for the implementation of Filters 24–29. The teachings of the above-mentioned Foster Patent may be used to set the filter characteristics so that the responses of FIGS. 4A and 4B may be produced from the measured response characteristics of the actual detectors being used.

Figure 4C:
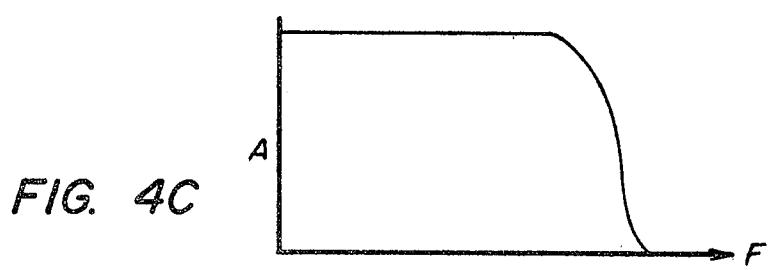

When the filtered outputs having the frequency responses shown in FIGS. 4A and 4B are combined, the broad, flat frequency spectrum of FIG. 4C is produced. This is a very desirable response of a seismic detector to a primary reflection.

Figure 5C:

FIGS. 5A and 5B are time domain representations of the filter outputs. A technique of determining the required deconvolution operators of the filters and implementing filters with such a deconvolution operator is shown in U.S. Pat. No. 3,274,542, Ruehle. (Band Broadening of Band Equalization.) In order to insure that the ghost reflections cancel, the gains of at least one of the two outputs are adjusted. Gain changing amplifiers 30–35 have been provided for this purpose. The outputs from the pairs of pressure and velocity detectors are combined in the adders 36 . . . 37, 38. The combined outputs will have an impulse response as shown in FIG. 5C. These outputs are recorded on recording medium 39 as is conventional.

While the invention may be implemented with analog filters, amplifiers, and summers, the preferred practice of the invention will be by way of a digital computer as is conventional in the seismic exploration art. Digital filtering, gain changing, and summation procedures are well known in the digital seismic processing art.

While a particular embodiment of the invention has been shown and described, various modifications may be made. The appended claims are, therefore, intended to cover all such modifications within the true spirit and scope of the invention.

What is claimed is:

1. A seismic detection system for suppressing ghost reflections relative to primary reflections in seismic exploration wherein a primary reflection is caused by an upwardly travelling compressional wave and a ghost reflection is caused by a rarefaction wave travelling downwardly from the surface comprising:
    a pressure detector producing a positive output in response to upwardly travelling compressional waves and a negative output in response to downwardly travelling rarefaction waves;
    a velocity detector producing a positive output in response to upwardly traveling compressional waves and a positive output in response to downwardly travelling rarefaction waves;
    filter means for changing the frequency content of at least one of said outputs including a minimum phase deconvolution operator having a predetermined amount of white noise added to the zero lag of the auto correlation function;
    means for changing the gains of said outputs so that the outputs produced in response to the ghost reflections are substantially equal;
    means for summing the outputs of said pressure and velocity detectors, thereby substantially cancelling the outputs produced in response to ghost reflections; and
    means for positioning said pressure and velocity detectors in close proximity along a line of seismic exploration.

2. The system recited in claim 1 wherein said deconvolution operator is the inverse of the distortion introduced by said pressure and velocity detectors.

* * * * *